(12) United States Patent
Belokin

(10) Patent No.: US 7,918,219 B2
(45) Date of Patent: Apr. 5, 2011

(54) PROJECTILE LAUNCHING ASSEMBLY

(75) Inventor: Paul Belokin, Denton County, TX (US)

(73) Assignee: Martin Paul, Inc., Denton, TX (US)

( * ) Notice: Subject to any disclaimer, the term of this patent is extended or adjusted under 35 U.S.C. 154(b) by 240 days.

(21) Appl. No.: 12/154,651

(22) Filed: May 27, 2008

(65) Prior Publication Data

US 2009/0293853 A1 Dec. 3, 2009

(51) Int. Cl.
*F41B 7/08* (2006.01)

(52) U.S. Cl. ............... 124/81; 124/16; 124/25; 124/26; 124/27; 124/31; 42/54; 42/78; 273/129 R; 273/129 S; 273/129 T; 273/129 V; 273/129 W; 473/569; 473/613

(58) Field of Classification Search ............... 124/16, 124/25–27, 31, 81; 42/54, 78; 273/129 R; 473/569, 613
See application file for complete search history.

(56) References Cited

U.S. PATENT DOCUMENTS

| | | | | |
|---|---|---|---|---|
| 3,088,451 A * | 5/1963 | Crosby et al. | | 124/27 |
| 3,114,362 A * | 12/1963 | Hellman | | 124/27 |
| 3,154,062 A * | 10/1964 | Ryan | | 124/16 |
| 3,204,627 A * | 9/1965 | Yano | | 124/49 |
| 3,418,995 A * | 12/1968 | Heller | | 124/27 |
| 3,430,620 A * | 3/1969 | Davis | | 124/27 |
| 3,465,744 A * | 9/1969 | Nielsen | | 124/27 |
| 3,744,493 A * | 7/1973 | Booher et al. | | 604/62 |
| 3,968,784 A * | 7/1976 | Miller | | 124/27 |
| 4,030,472 A * | 6/1977 | Watkins | | 124/5 |
| 4,195,615 A * | 4/1980 | Belokin | | 124/16 |
| 4,386,478 A * | 6/1983 | Belokin | | 43/135 |
| 4,450,649 A * | 5/1984 | Dunwoody | | 43/135 |
| 4,541,402 A * | 9/1985 | Winters | | 124/27 |
| 4,583,958 A * | 4/1986 | Matsuda | | 446/308 |
| 4,625,619 A * | 12/1986 | Ceniza | | 89/1.57 |
| 4,930,395 A * | 6/1990 | Loffler | | 89/8 |
| 5,033,446 A * | 7/1991 | Bradt | | 124/26 |
| 5,145,740 A * | 9/1992 | Boykin | | 428/371 |
| 5,156,137 A * | 10/1992 | Clayton | | 124/27 |
| 5,189,244 A * | 2/1993 | Weldon | | 89/8 |
| 5,261,852 A * | 11/1993 | Ejima | | 446/405 |
| 5,372,118 A * | 12/1994 | Schmidt et al. | | 124/22 |
| 5,438,972 A * | 8/1995 | Harbin | | 124/27 |
| 5,447,144 A * | 9/1995 | Ivy | | 124/26 |
| 5,491,924 A * | 2/1996 | Athanasiadis | | 43/19 |
| 5,582,392 A * | 12/1996 | Bajric et al. | | 254/134.3 R |
| 5,595,166 A * | 1/1997 | Schmidt et al. | | 124/22 |
| 5,613,482 A * | 3/1997 | Thai et al. | | 124/16 |
| 5,738,079 A * | 4/1998 | Keller et al. | | 124/66 |
| 5,803,060 A * | 9/1998 | Skivran | | 124/16 |
| 6,048,280 A * | 4/2000 | Palmer et al. | | 473/416 |
| 6,119,671 A * | 9/2000 | Smith et al. | | 124/59 |
| 6,152,123 A * | 11/2000 | Ferrante et al. | | 124/16 |
| 6,244,261 B1 * | 6/2001 | West, Jr. | | 124/60 |
| 6,732,725 B2 * | 5/2004 | Doud | | 124/27 |
| 6,877,500 B1 * | 4/2005 | Hollars et al. | | 124/24.1 |
| D521,076 S * | 5/2006 | Walker | | D21/385 |

(Continued)

*Primary Examiner* — Gene Kim
*Assistant Examiner* — Alexander R Niconovich
(74) *Attorney, Agent, or Firm* — Jack A. Kanz

(57) ABSTRACT

A simulated gun launches a retrievable projectile in the form of a cylinder containing a compressible spring. The spring is compressed by inserting the barrel of the gun into the bore of the cylinder. A tab on the end of the cylinder rides in a helical groove on the surface of the barrel to cause the projectile to rotate about the axis of the barrel as the projectile is launched.

5 Claims, 4 Drawing Sheets

U.S. PATENT DOCUMENTS

| | | | |
|---|---|---|---|
| D527,774 S * | 9/2006 | Belokin et al. | D21/573 |
| 7,156,085 B2 * | 1/2007 | Lewis et al. | 124/66 |
| 7,861,698 B2 * | 1/2011 | Nordstog | 124/16 |
| 2003/0056776 A1 * | 3/2003 | Doud | 124/27 |
| 2005/0103318 A1 * | 5/2005 | Leal et al. | 124/74 |
| 2006/0225719 A1 * | 10/2006 | Leal et al. | 124/71 |
| 2008/0022988 A1 * | 1/2008 | Rosenblum et al. | 124/27 |
| 2008/0035134 A1 * | 2/2008 | Nordstog | 124/16 |
| 2009/0071456 A1 * | 3/2009 | Chia | 124/16 |

* cited by examiner

PROJECTILE LAUNCHING ASSEMBLY

This invention relates to amusement devices. More particularly, it relates to toy simulated gun devices which launch small retrievable projectiles.

U.S. Pat. No. 4,195,615 entitled Retrievable Projectile Gun describes a highly popular assembly which launches a projectile in the form of an insect-killing disc. The disc is mounted on the front end of a cylinder which contains a compressible spring. A plunger in the form of a barrel is inserted into the cylinder to compress the spring and the cylinder is releasably secured on the plunger with a trigger-operated latch. When the latch is released, the spring expends to launch the projectile.

While the retrievable projective gun assembly of U.S. Pat. No. 4,195,615 has been quite successful and become extremely popular, the projectile tends to be somewhat aerodynamically and orientationally unstable when launched and the launch trajectory is therefore unpredictable. As a result, in launching the projectile at a pre-selected target, accuracy is somewhat unsatisfactory.

In accordance with the present invention, a projectile and launching assembly of the type disclosed in U.S. Pat. No. 4,195,615 is provided with means for rotating the projectile axially with respect to the plunger when the projectile is launched. Axial rotation of the projectile during launching provides gyroscopic stabilization to the cylindrical projectile, thereby ensuring that the projectile follows a predictable trajectory and improving accuracy in launching the projectile at pre-selected targets.

Other features and advantages of the invention will become more readily understood from the following detailed description taken in connection with the appended claims and attached drawing in which:

Figure 1:
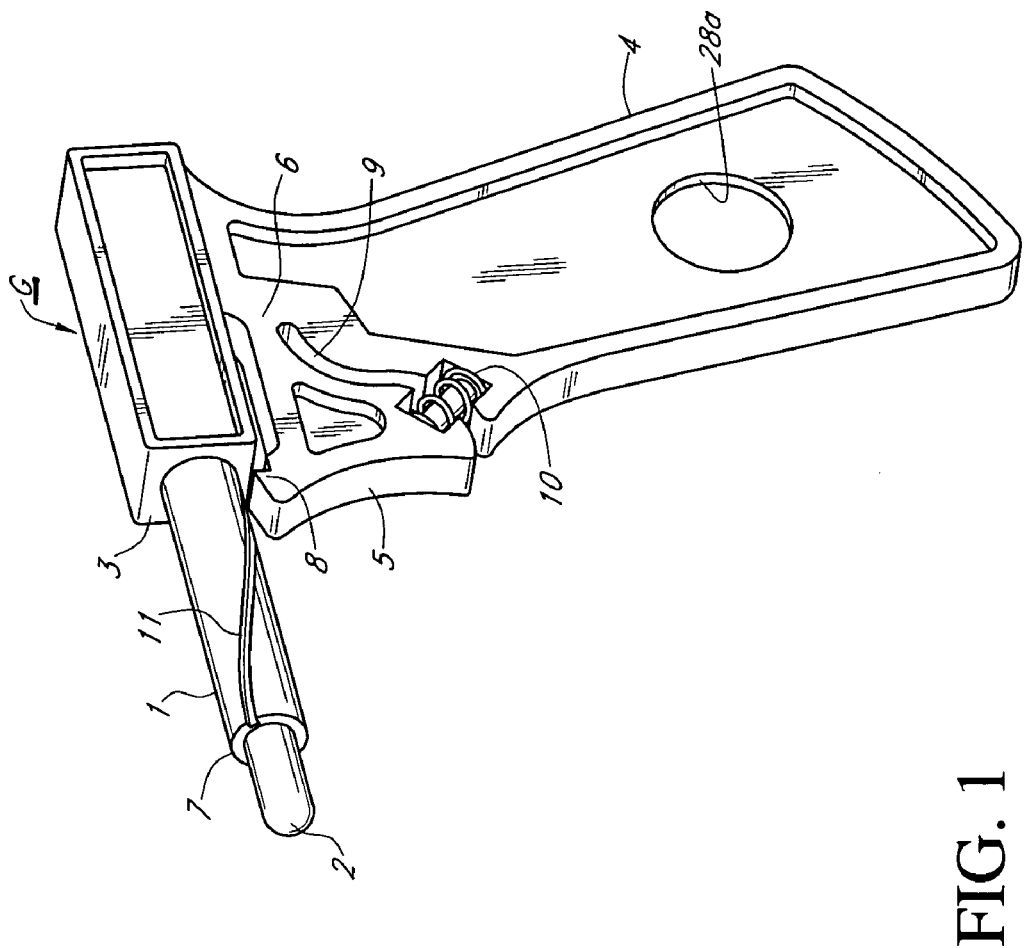
FIG. 1 is a perspective view of the major components of the invention aligned for assembly in accordance with the invention.
Figure 1:
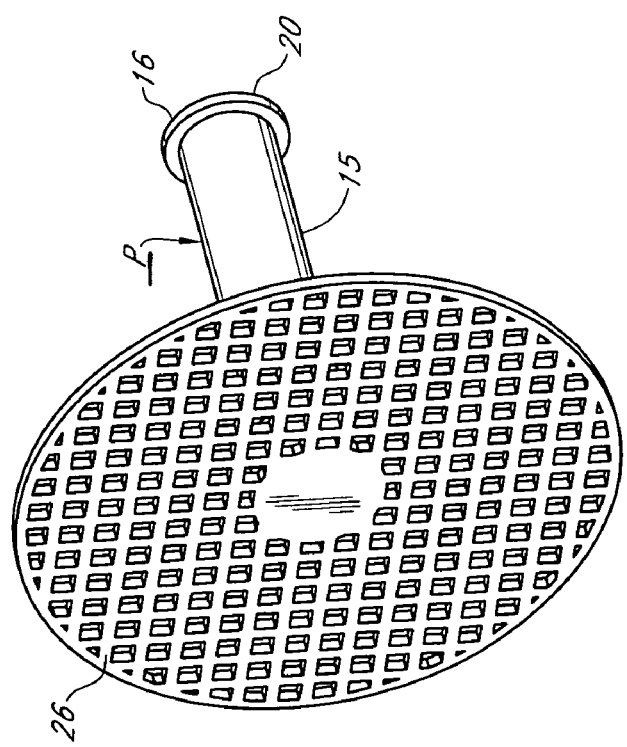

The above-described drawing is incorporated into and forms part of the specification to illustrate an exemplary embodiment of the present invention. Throughout the drawing like reference numerals designate corresponding elements. The figures are not to scale but are intended to disclose the inventive concepts by illustration. This drawing, together with the description, serves to explain the principles of the invention and is only for the purpose of illustrating preferred and alternative examples of how the invention can be made and used.

It will be recognized that the principles of the invention may be utilized and embodied in many and various forms. The invention, however, is not limited to the forms illustrated and described. Furthermore, the invention is not limited to use in connection with any particular configuration of the projectile or launcher portions of the assembly.

For perspective and consistency in describing the assembly illustrated, the leading end of the projectile when the projectile is launched is referred to as the front, forward or first end thereof and the opposite end referred to as the back, rear or trailing end. Similarly, spatial orientation and relative terms such as "upwardly," "downwardly," "rearwardly," "horizontally," "above," "below," "upper," "lower" and the like are used in reference to the orientation of the assembly when the assembly is arranged and positioned for use.

As hereinafter described, the invention comprises a projectile and launcher assembly designed to impart axial rotation to the projectile when the projectile is launched. The launcher comprises an elongated barrel mounted on a handle. The projectile is adapted to be slideably mounted on the barrel. To impart launching force, a spring is compressed when the projectile is mounted on the barrel and the projectile releasably secured in launching position with a latch which engages a trigger means. Cooperating means carried on the barrel and projectile cause the projectile to rotate about its axis as it travels along the barrel to impart gyroscopic stability to the launched projectile.

In the embodiment illustrated, the assembly comprises a launcher in the form of a simulated gun G and a projectile P which is launched by the gun G. The gun G defines a barrel 1 having a front end 2 and a rear end 3. The barrel is supported on a pistol grip handle 4. The handle 4 includes a trigger 5 which is attached to the handle 4 by an integrally formed hinge 6.

Trigger 5 supports a latch tang 8 near the rear end 3 of barrel 1 to engage the projectile as described hereinafter. The free end of trigger 5 is spaced from the handle 4 by a gap 9 so that the trigger 5 may pivot about hinge 6. Resilient means such as coiled trigger spring 10 may be positioned in gap 9 to urge the trigger and latch tang 8 upwardly toward the barrel 1.

The gun G, including barrel 1, handle 4 and trigger 5, is preferably formed as an integral unit of molded plastic or the like.

A groove 11 in the surface of barrel 1 extends axially along the length of barrel 1. The groove 11 defines a helix which extends substantially the length of barrel 1. The helical groove 11 may be a single groove which winds around the barrel 1 or may be in the form of a plurality of parallel helical grooves. Helical groove 11 need not encircle the entire circumference of the barrel 1 but should extend over a substantial arc of the circumference of the barrel to impart rotation of the projectile P as described hereinafter.

In the preferred embodiment the projectile P comprises an axially elongated cylindrical body 15 having a front end 17 and an open rear end 16. A radially extending disc 26 formed of soft plastic or the like defines an impact surface for hitting targets such as insects and the like. To reduce weight and provide less aerodynamic resistance, the disc 26 may be perforated or in the form of a screen or the like. Obviously, the disc need not be circular but may take any form or dimensions desired.

The disc 26 is supported on and secured to the front end 17 of cylindrical body 15 by means of a centrally located collar 27 or the like.

Figure 3:
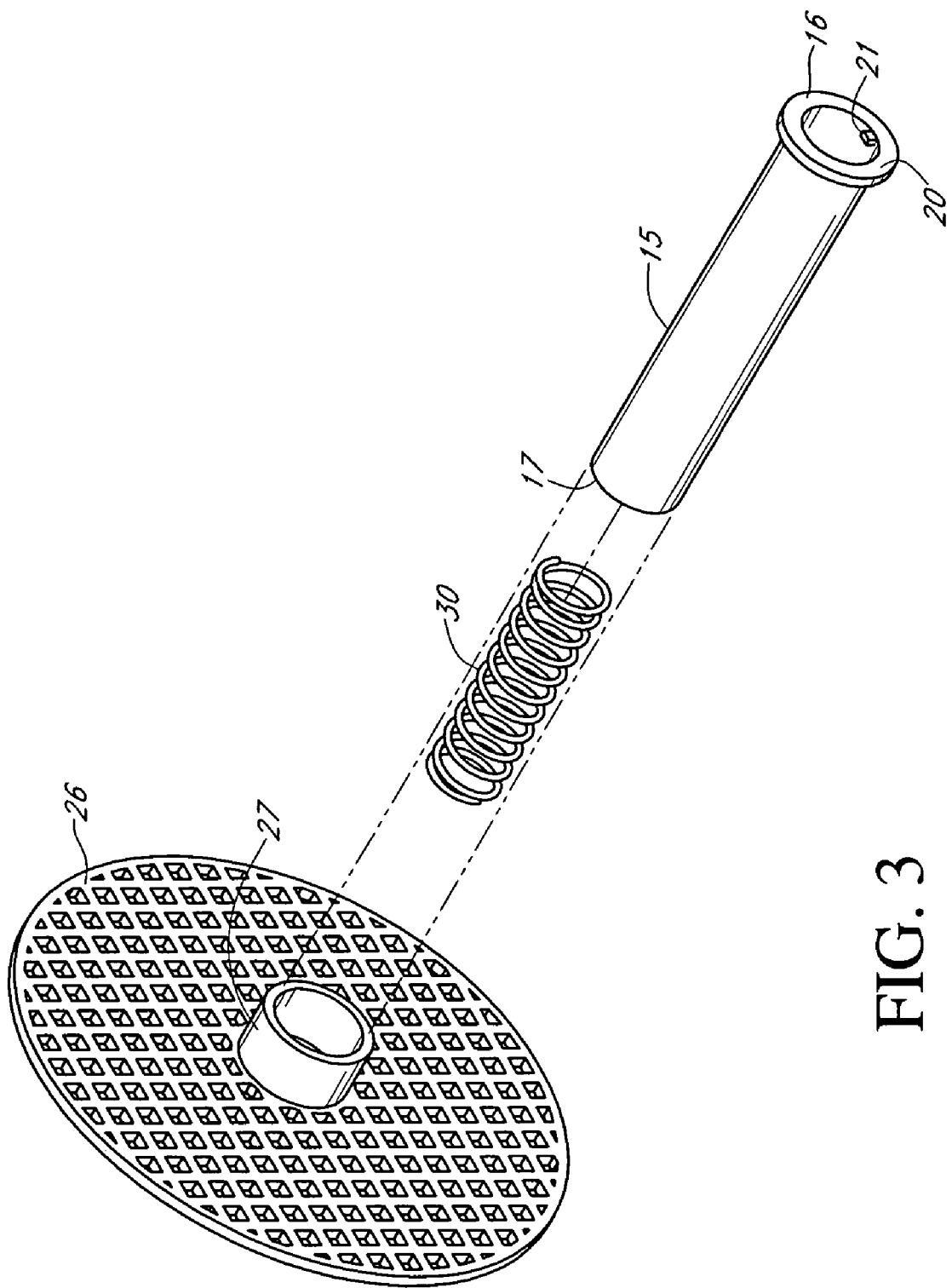
FIG. 3 is an exploded view of the projectile assembly illustrated in FIG. 1.
Figure 4:
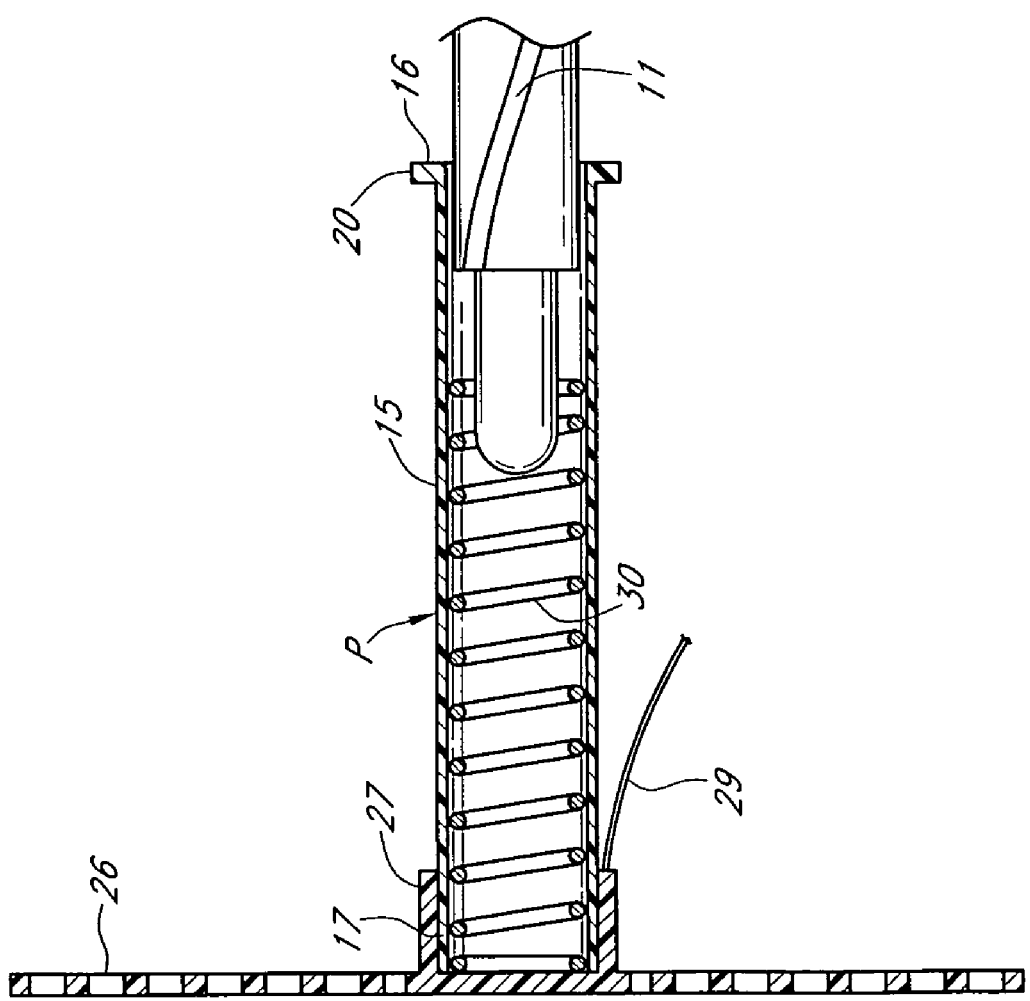
FIG. 4 is a sectional view of the projectile assembly of FIG. 3 illustrating mounting of the projectile on the launcher assembly.

As illustrated in FIGS. 3 and 4, a coil spring 30 is positioned within the central bore of cylindrical body 15 with its forward end secured adjacent the disc 26. The open rear end 16 of cylindrical body 15 supports a radially inwardly projecting tooth or tab 21 which is adapted to extend into and slide along groove 11 when the cylindrical body 15 is positioned on barrel 1. A flange 20 extends radially outwardly from the open rear end 16.

In the preferred embodiment the front end 2 of barrel 1 has a reduced diameter defining a shoulder 7 displaced form the forward end of the barrel.

Figure 2:
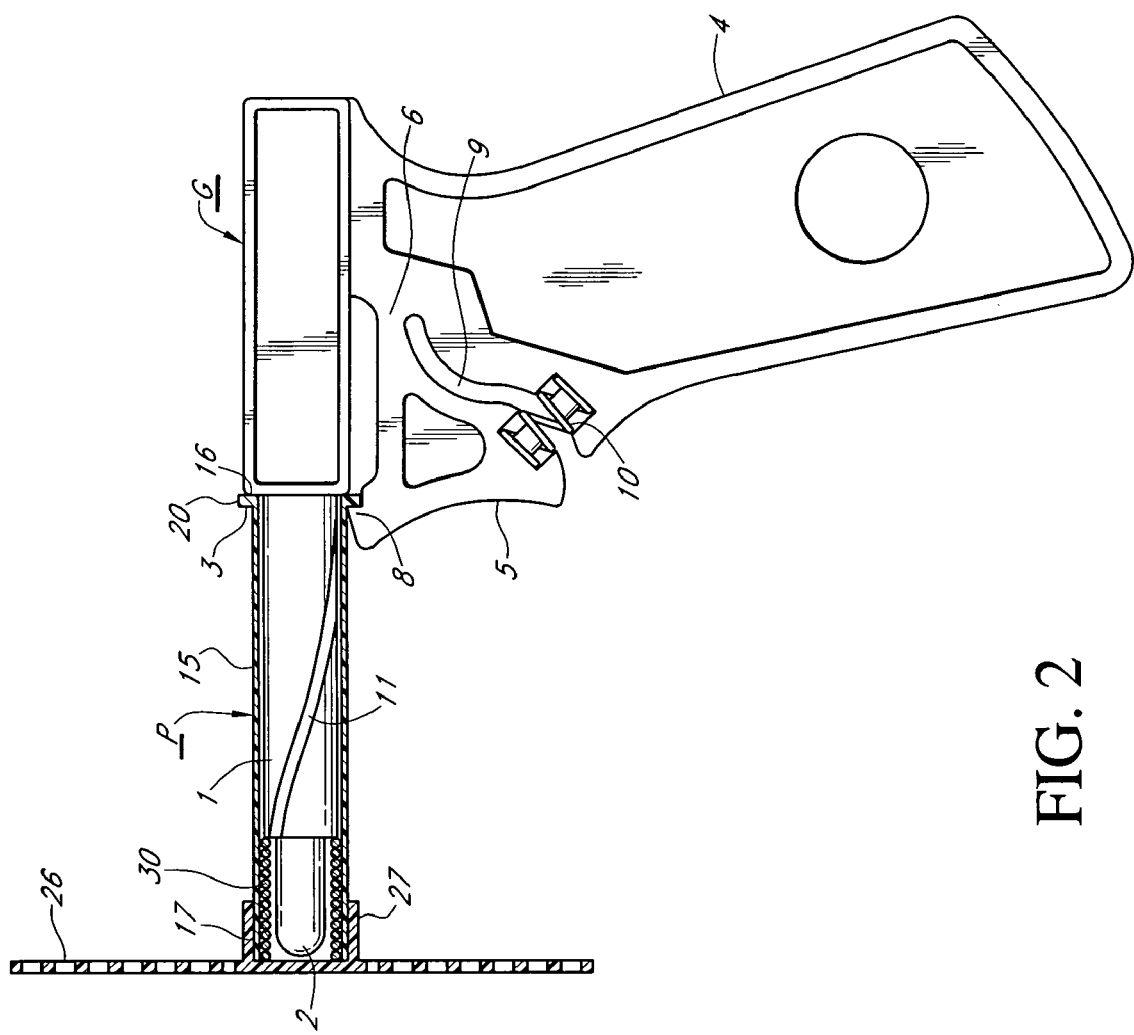
FIG. 2 is a side elevational view, particularly in section, illustrating the apparatus of the invention in the assembled condition.

When the apparatus is assembled for launching (see FIG. 2) the forward end 2 of the barrel is inserted into the open rear end 16 of the cylindrical body 15. As the cylindrical body 15 is telescoped over the barrel 1, the rear end of spring 30 engages shoulder 7 and coil spring 30 is compressed. As the barrel 1 is inserted into the cylindrical body 15, tab 21 fits into and slides along the length of groove 11. When the barrel 1 is fully inserted, flange 20 rides over and engages latch tang 8. Since trigger 5 supporting latch tang 8 is urged upwardly by trigger spring 10, latch tang 8 releasably engages flange 20 and secures the projectile P on barrel 11 with coil spring 30 compressed as illustrated in FIG. 2.

The projectile P is launched by moving trigger 5 to compress trigger spring 10, thereby moving latch tang 8 downwardly to disengage flange 20. When flange 20 is released, coil spring 30 expands rapidly, launching projectile P from the barrel 1. As projectile P moves axially along barrel 1, tab 21 rides in helical groove 11. Since groove 11 is helical, forward movement of the projectile P causes rotation of projectile P around the barrel 1. Thus projectile P is launched forward while rotating about the axis of cylindrical body 15. The projectile P is thus gyroscopically stabilized by its axial rotation and thus follows a more predictable trajectory. While the embodiment illustrated employees a helical groove in the barrel cooperating with a tab carried on the projectile, it wilt be recognized that the reverse arrangement, wherein a tab mounted on the barrel cooperates with a helical groove in the body of the projectile, will accomplish the same results.

In the preferred embodiment illustrated, all components except the coil spring 30 and trigger spring 10 are formed in molded plastic. Various other materials may be used as desired. Similarly, the particular forms of the components may likewise be varied as desired without departing from the principles of the invention.

It is to be understood that even though numerous characteristics and advantages of the invention have been set forth in the foregoing description together with details of the structure and function of the invention, this disclosure is to be considered illustrative only. Various changes and modifications may be made in detail, especially in matters of shape, size, arrangement and combination of parts, without departing from the spirit and scope of the invention as defined by the appended claims.

What is claimed:

1. A projectile and launcher assembly comprising:
   (a) a projectile comprising:
      (i) an axially elongated cylinder having a first end and an open second end;
      (ii) a substantially flat flexible disc supported on and extending radially from the first end of said axially elongated cylinder;
      (iii) a bore extending from the first end through the open second end of said cylinder;
      (iv) compression spring means mounted within said bore;
      (v) at least one tab mounted adjacent said open second end and extending radially into said bore; and
      (vi) latch engaging means on the exterior surface of said elongated cylinder; and
   (b) a projectile launcher comprising:
      (i) an elongated barrel having a front end and a rear end and having a diameter which slideably fits within said elongated cylinder;
      (ii) a shoulder on said barrel adapted to mate with and compress said compression spring when said barrel is inserted within said cylinder;
      (iii) at least one helical groove on the external surface of said barrel adapted to mate with said tab on said cylinder which causes said cylinder to rotate with respect to said barrel when said cylinder moves axially with respect to said barrel;
      (iv) handle means depending from the rear end of and supporting said barrel; and
      (v) trigger means mounted on said handle means adapted to engage said latch engaging means and releaseably secure said cylinder on said barrel when said compression spring is compressed.

2. A projectile and launcher assembly as defined in claim 1 wherein said at least one helical groove comprises a pair of parallel helical grooves.

3. A projectile and launcher assembly as defined in claim 1 wherein said latch engaging means comprises a flange extending radially outwardly from said open second end of said cylinder.

4. A projectile and launcher assembly as defined in claim 1 wherein said trigger means is mounted on said handle means with an integrally formed hinge and carries a latch tang adapted to engage said latch engaging means.

5. A projectile and launcher assembly comprising:
   (a) a projectile launcher including an elongated barrel mounted on a handle;
   (b) a projectile slideably mounted on said barrel;
   (c) spring means which is compressed when said projectile is slideably mounted on said barrel;
   (d) latch engaging means carried on said projectile;
   (e) trigger means supported on said handle adapted to engage said latch engaging means and releaseably secure said projectile on said barrel;
   (f) a tab carried on said projectile cooperating with a helical groove on said barrel which imparts axial rotation to said projectile when said projectile moves axially along said barrel.

* * * * *